June 12, 1951 — A. RAPPL — 2,556,440
WINDSHIELD CLEARING SYSTEM
Filed March 5, 1947
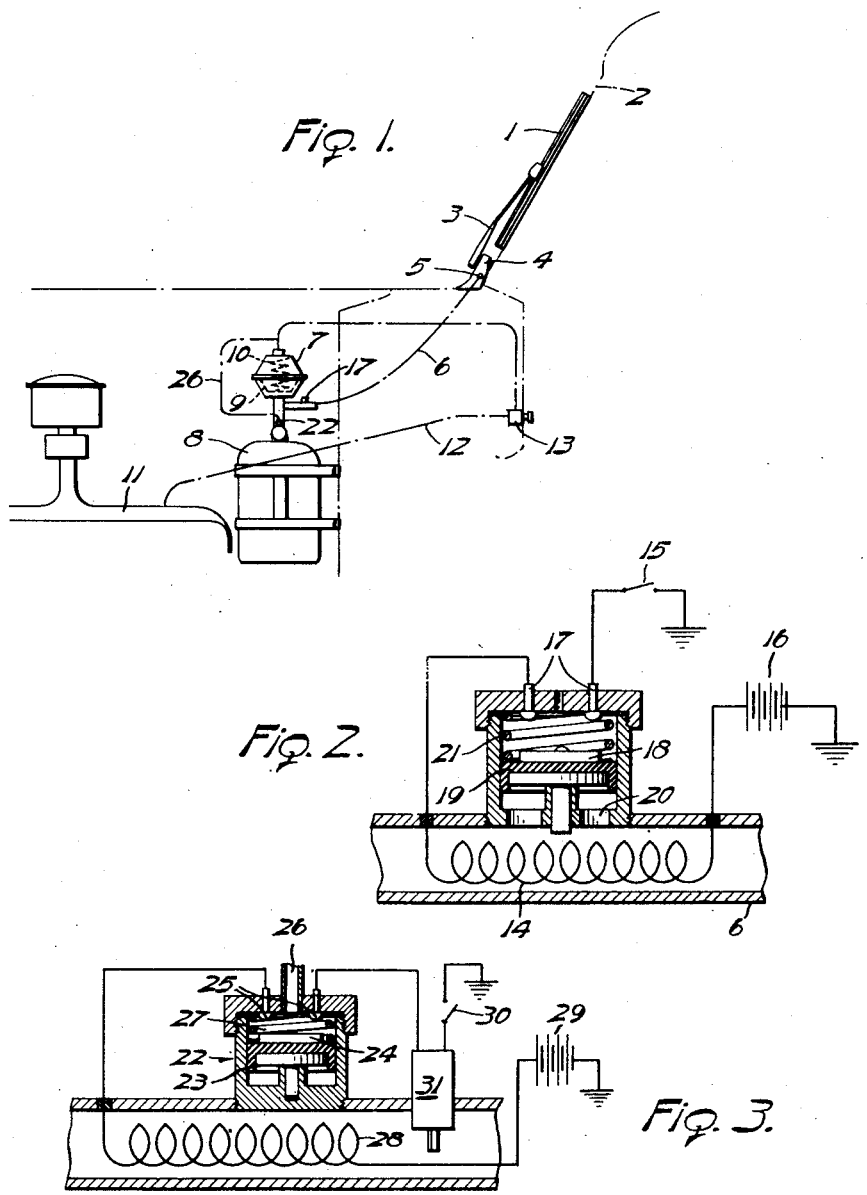
INVENTOR
*Anton Rappl*
BY
*Bean Brooks, Buckley & Bean.*
ATTORNEYS Patented June 12, 1951

2,556,440

UNITED STATES PATENT OFFICE 2,556,440

WINDSHIELD CLEARING SYSTEM

Anton Rappl, Eggertsville, N. Y., assignor to Trico Products Corporation, Buffalo, N. Y.

Application March 5, 1947, Serial No. 732,405

8 Claims. (Cl. 219—39)

This invention relates to a windshield clearing system and generally to that class of automotive equipment employed for washing the windshield free of vision-obscuring matter.

The modern automobile is frequently equipped with an arrangement for squirting water or other liquid solvent onto the windshield in the path of the oscillating wiper. A predetermined volume of the liquid is withdrawn from a reservoir and expelled onto the windshield at a given pressure by means of a pump having a liquid dispensing member normally spring-pressed to the end of its discharged stroke and responsive to suction for intaking the liquid charge. It has heretofore been proposed to provide a low freezing liquid for winter use but care must be exercised in the selection of the winter liquid to guard against marring the finish of the car. It would be ideal if plain water could be used at a temperature which would prevent the liquid freezing upon the windshield.

The object of the present invention is to provide an apparatus of this character by which plain water may be employed.

A further object of the invention is to provide a windshield spraying apparatus in which the liquid is automatically heated by and upon placement of the device in use.

Again the invention has for its object to provide a windshield spraying device in which the liquid heater is responsive to the functioning of the system and in a manner to render its use safe and practical.

The foregoing and other objects will manifest themselves as the following description progresses, reference being had to the accompanying drawing wherein:

Fig. 1 is a diagrammatic view illustrating a windshield washing apparatus constructed in accordance with the present invention;

Fig. 2 is a detailed sectional view through the heating unit; and

Fig. 3 is a similar view of a secondary or modified form of heater.

Referring more particularly to the drawing, the numeral 1 designates the conventional wiper which is oscillated across the windshield surface 2 by means of an arm 3, the arm being fixed to a shaft that is journaled in a cowl mounted housing 4. This housing provides a convenient mount for a spray nozzle generally indicated by the numeral 5, the same being connected by a conduit 6 to a pump 7 arranged on a liquid reservoir 8. The pump may be of that form shown in the earlier Patent 2,142,056 which employs a diaphragm 9 backed by a spring 10. The upper side of the diaphragm is opened to the suction influence of the intake manifold 11 by means of a conduit 12 in which is interposed a control valve 13. When the control valve is opened the suction influence will lift the fluid displacing member 9 to intake a charge of liquid from the reservoir, and when the valve 13 is released or closed it will vent the spring chamber of the pump to the atmosphere so that the spring will be free to depress the diaphragm and eject the charge of liquid out through the conduit 6 and nozzle 5. It will thus be noted that the discharging liquid will be subjected to the spring pressure for a given or predetermined interval of time.

According to the present invention an electric heater is employed for heating the water or liquid solvent. This heater may be of the immersion type, the same having an electric resistance element 14 which may be suitably connected by manual switch 15 to a battery or other source of electrical energy 16. The heater is rendered automatic with the operation of the spray system. According to the illustrated embodiment, advantage is taken of the pressure on the liquid being discharged. In other words, a hydraulic pressure responsive switch is employed for opening and closing the circuit after the switch 15 has been manually set for winter use. As depicted in Fig. 2, such a hydraulic switch has been illustrated. In its simplest form it may comprise a pair of contacts 17 adapted to be bridged by a plate 18 carried by a piston 19, the piston being open through ports 20 to the liquid in the conduit 6. A spring 21 normally holds the bridging contact 18 in a circuit-open position. However, when the pump is discharging the hydraulic pressure in the conduit 6 will react on the plunger 19 against the urge of spring 21 and move the bridging contact 18 into a circuit-closing position. The resistance element will thereby become energized to heat the charge of liquid as it flows onto the nozzle 5. In this connection it will be observed that the initial portion of the spray will be relatively cool and the remaining portion will gradually warm up so as to taper the application of hot water to the windshield glass in order to avoid injuring the latter.

In lieu of having the water heater interposed between the reservoir and the discharge nozzle, it may be disposed at the inlet side of the pump, as shown at 22. Like the embodiment of Fig. 2, the pressure responsive switch may have a piston 23 slidable in the cylinder 22 and carrying a contact bridging plate 24 for bridging the gap between the spaced contacts 25. Instead of having the pressure responsive member 23 acted upon by the liquid in the system, the chamber 22 is closed to the liquid and a conduit 26 is provided to open the upper end of the chamber to the source of suction. The conduit 26 preferably intersects the suction line between the control valve 13 and the pump 7 so that every time the control valve is opened to actuate the pump, the piston 23 will be drawn upwardly against the urge of spring 27 to close the electric circuit embodying the resistance element 28 and the battery 29. A manual switch 30 will of course be provided to incapacitate the heater for summer weather.

To preclude an excessive heating of the liquid there is provided a thermostatic switch 31 in the circuit which will respond to a predetermined temperature of the liquid to open the circuit. This provision is a safety one in that it will prevent the heater against functioning indefinitely should the control valve be held open for an abnormal period or that the pressure responsive member 23 become stuck in a circuit-closing position.

The resistance element 28 is shown also as being of the immersion type. Obviously, it might be in the form of a jacket surrounding the reservoir, or it may be of some other suitable or desired type.

While the foregoing description has been given in detail it is obvious that the inventive teachings and principles may be incorporated in other physical embodiments without departing from the spirit of the invention and the scope of the appended claims.

What is claimed is:

1. A windshield washing system for motor vehicles, comprising a spray nozzle, a fluid supply therefor, means operable to deliver fluid from the supply to the nozzle, and a control connected to the delivery means for operating the same, combined with an electric resistance connected in an electric circuit and fluid pressure responsive means for closing the circuit to energize the resistance.

2. A windshield washing system for motor vehicles, comprising a spray nozzle, a fluid supply therefor, means operable to deliver fluid from the supply to the nozzle and a control connected to the delivery means for operating the same, combined with an electric heater in contact with the fluid, and an electric circuit including the heater and embodying a pressure responsive switch for closing the circuit, said pressure responsive switch being responsive to the fluid at the outlet side of the delivery means.

3. A windshield washing system for motor vehicles, comprising a spray nozzle, a liquid supply therefor, a suction actuated pump connected to the nozzle and supply, a valve for opening the pump to a source of suction supply, an electric heater for the liquid, and a suction responsive switch interposed in the suction line between the pump and the control valve for energizing the heater.

4. A windshield washing system for motor vehicles, comprising a spray nozzle, a liquid reservoir, a pressure operated pump operable to deliver liquid from the reservoir to the nozzle, a valve for controlling the pressure for operating the pump, an electric heater, a pressure responsive switch under the control of said control valve for closing an electric circuit including the electric heater, and thermostatic means responsive to the temperature of the liquid for opening the heater circuit.

5. A windshield washing system for motor vehicles, comprising a spray nozzle, a fluid supply connected to the nozzle, fluid pressure actuated means interposed between the nozzle and the supply and operable to deliver fluid under pressure from the supply to the nozzle, a control for said fluid pressure actuated means operable to connect the latter to a source of operating pressure, an electric heater for the fluid, and a switch for connecting the electric heater to a source of electrical energy, said switch being responsive to the pressure of one of said fluids.

6. A windshield washing system for motor vehicles, comprising a spray nozzle, a fluid supply connected to the nozzle, fluid pressure actuated means interposed between the nozzle and the supply and operable to deliver fluid under pressure from the supply to the nozzle, a control for said fluid pressure actuated means operable to connect the latter to a source of operating pressure, an electric heater for the fluid, a switch for connecting the electric heater to a source of electrical energy, said switch being responsive to the pressure of one of said fluids, and thermostatic means responsive to the temperature of the fluid delivered to said nozzle for regulating the same.

7. A windshield washing system for motor vehicles, comprising a spray nozzle, a fluid supply therefor, a pump interposed between the supply and the nozzle having an intake stroke and a delivery stroke, a heater for the fluid, means for operating the pump, and means for energizing the heater substantially for the duration of one stroke of the pump.

8. A windshield washing system for motor vehicles, comprising a spray nozzle, a fluid supply therefor, a fluid actuated pump interposed between the supply and the nozzle having an intake stroke and a delivery stroke, a heater for the fluid, means for operating the pump, and fluid pressure responsive means for successively energizing the electric heater for substantially the duration of one of the pump strokes.

ANTON RAPPL.

REFERENCES CITED

The following references are of record in the file of this patent:

UNITED STATES PATENTS

| Number | Name | Date |
|---|---|---|
| 1,026,564 | Crawford | May 14, 1912 |
| 1,665,031 | Herman | Apr. 3, 1928 |
| 1,794,215 | Titus | Feb. 24, 1931 |
| 1,937,286 | McCarthy | Nov. 28, 1933 |
| 1,984,851 | Vinz | Dec. 18, 1934 |
| 2,091,838 | Staak | Aug. 31, 1937 |
| 2,103,371 | Kleckner | Dec. 28, 1937 |
| 2,277,291 | Blair | Mar. 24, 1942 |